United States Patent
Chun et al.

(10) Patent No.: US 11,080,518 B2
(45) Date of Patent: Aug. 3, 2021

(54) FACE IMAGE GENERATING METHOD FOR RECOGNIZING FACE

(71) Applicant: EVER INFORMATION TECHNOLOGY CO., LTD., Daejeon (KR)

(72) Inventors: Jae Du Chun, Daejeon (KR); Min Jung Lee, Sejong-si (KR)

(73) Assignee: EVER INFORMATION TECHNOLOGY CO., LTD., Daejeon (KR)

( * ) Notice: Subject to any disclaimer, the term of this patent is extended or adjusted under 35 U.S.C. 154(b) by 0 days.

(21) Appl. No.: 16/931,029

(22) Filed: Jul. 16, 2020

(65) Prior Publication Data

US 2021/0150188 A1 May 20, 2021

(30) Foreign Application Priority Data

Nov. 15, 2019 (KR) .......................... 10-2019-0146607

(51) Int. Cl.
*G06K 9/00* (2006.01)

(52) U.S. Cl.
CPC ..... *G06K 9/00281* (2013.01); *G06K 9/00248* (2013.01)

(58) Field of Classification Search
CPC ........... G06K 9/00281; G06K 9/00248; G06K 9/00295; G06K 9/00369; G06K 9/00268; G06K 9/00221
See application file for complete search history.

(56) References Cited

U.S. PATENT DOCUMENTS

| | | | |
|---|---|---|---|
| 2011/0234640 A1* | 9/2011 | Ishida | H04N 5/232941 345/671 |
| 2011/0234852 A1* | 9/2011 | Ishida | H04N 5/225 348/231.99 |
| 2011/0267489 A1* | 11/2011 | Sagawa | G06T 7/246 348/222.1 |
| 2014/0341442 A1* | 11/2014 | Lewis | G06T 7/11 382/118 |
| 2018/0165832 A1* | 6/2018 | Nakayama | G06K 9/00221 |

FOREIGN PATENT DOCUMENTS

| | | |
|---|---|---|
| KR | 1020090020390 | 2/2009 |
| KR | 102039277 | 10/2019 |

* cited by examiner

*Primary Examiner* — Md K Talukder
(74) *Attorney, Agent, or Firm* — IPLA P.A.

(57) ABSTRACT

A face image generating method for recognizing face performed by a face image generating device to extract a face image from image frames collected from an image acquiring device and generate a face image for face recognition, includes: a first step of converting an RGB-based image frame received from the image acquiring device into a YCbCr image; a second step of setting a region satisfying a skin color condition in the YCbCr image as a face candidate region; a third step of determining a face region; a fifth step of calculating a degree of inclination of a side face; and a sixth step of generating a face image for recognition by converting the front face image and the side face image into different sizes according to a distance to the image acquiring device.

6 Claims, 4 Drawing Sheets

FACE IMAGE GENERATING METHOD FOR RECOGNIZING FACE

BACKGROUND

The present disclosure relates to a technology for extracting a face image of a person from images acquired by an image acquiring device and processing the extracted face image into a form corresponding to a pre-registered format to more accurately recognize the face of the person.

In recent years, facial recognition technologies have been utilized in a variety of fields including a door control apparatus. There is an increasing trend because it has an active advantage over other biometric technologies such as a fingerprint or an iris recognition and so on.

In a case of the fingerprint or the iris recognition, there is a hassle to take the action of the user to contact the finger to the fingerprint recognition sensor or close the eye to the iris recognition sensor in order to accept verification.

However, in the face recognition technologies, when the user's face is captured by the camera image, since the face recognition may be performed, the user does not need to perform an unnatural operation for authentication. In addition, there is an advantage that the user's face can be recognized and authenticated while the user is not aware.

In particular, the access control system for performing an access management using the face recognition of users, who are allowed to access, has been introduced.

The user recognition method using the face recognition is a method of allowing access, only when the facial feature information extracted from the user's picture taken by the camera of the access control system is compared and matched with the facial feature information of the previously stored user DB. Therefore, there is an advantage that the accuracy is high and the recognition speed is fast.

At this time, as a reference face image of a person who is allowed to enter in advance to recognize a person, the front face and the front face are generally used.

However, when comparing the face for person recognition, there is generally performed based on morphological features such as the location of the feature points, the size, and the shape of the eyes, the nose, and the mouth that make up the face. At this time, the size and shape of the feature points of the side face image have a lot of differences from the front face.

As a result, in the user recognition method using the face recognition, recognition errors can occur due to a low recognition accuracy when lighting is insufficient or the user's face angle is displaced by a predetermined angle or more from the front.

PATENT LITERATURE

Patent Literature 1: Korean Patent Registration No. 10-1363017 (Title of invention: SYSTEM AND METHOD FOR TAKING AND CLASSIFYING FACIAL IMAGE)

Patent Literature 2: Korean Patent Registration No. 10-2039277 (Title of invention: PEDESTRIAN FACE RECOGNITION SYSTEM AND METHOD THEREOF)

SUMMARY OF THE INVENTION

Therefore, the present disclosure has been made in consideration of the above-described circumstances, and a technical object of the present disclosure is to provide a method for generating a face image to recognize a face, the method which is implemented by extracting a face image of a person from images collected from an image acquiring device and processing a side face image into a true side image based on morphological characteristics of the face, thereby recognizing the face of the person more accurately.

According to an aspect of the invention to achieve the object described above, there is provided a face image generating method for recognizing face performed by a face image generating device to extract a face image from image frames collected from an image acquiring device and generate a face image for face recognition, the method including: a first step of converting an RGB-based image frame received from the image acquiring device into a YCbCr image; a second step of setting a region satisfying a skin color condition in the YCbCr image as a face candidate region; a third step of determining a face region based on whether at least two feature points corresponding to an eye, a nose, or a mouth is included in the face candidate region; a fourth step of classifying a front face or a side face based on an eye feature existing in the face region and an aspect ratio of the face region and extracting each face region, thereby generating a front face image and a side face image; a fifth step of calculating a degree of inclination of a side face in the side face image based on location information of a nose and a chin and generating a true side face image using the calculated degree of inclination; and a sixth step of generating a face image for recognition by converting the front face image and the side face image into different sizes according to a distance to the image acquiring device.

In addition, in the first step, the face image generating device calls GML Camera Calibration Toolbox, extracts a landmark value from an RGB-based image frame collected from the image acquiring device using the GML Camera Calibration Toolbox, and converts an RBG-based image, which has been preprocessed by applying the extracted landmark value using calbration.cpp among sample folders of OpenCV, into a YCbCr image.

In addition, in the first step, the face image generating device converts the RGB-based image frame into the YCbCr image according to the following equation, and in the second step, the face image recognizing device extracts, as the face candidate region, a region satisfying a condition where Cb is "no less than 73 and no more than 132" and Cr is "no less than 124 and no more than 171"

$$\begin{bmatrix} Y \\ C_b \\ C_r \end{bmatrix} = \begin{bmatrix} 16 \\ 128 \\ 128 \end{bmatrix} + \begin{bmatrix} 0.257 & 0.504 & 0.098 \\ -0.148 & -0.291 & 0.439 \\ 0.439 & -0.368 & -0.071 \end{bmatrix} * \begin{bmatrix} R \\ G \\ B \end{bmatrix}.$$

In addition, in the fourth step, the face image generating device determines the face region as the side face image when an aspect ratio of the face region is about no less than "1:1.5" and no more than "1:2.5".

In addition, the fifth step includes a step of extracting, by the face image generating device, a contour of the side face image, moving a virtual straight line along the contour with respect to the chin, and generating a side face straight line having a maximum frequency of skin color on the straight line; a step of setting a location of the chin on the side face image as a horizontal axis, and calculating an angle between the horizontal axis and the side face straight line; and a step of generating a true side face image by correcting a side face based on the following equation so that the side face straight line becomes a vertical line relative to the horizontal axis, $$\begin{bmatrix} X \\ Y \end{bmatrix} = \begin{bmatrix} \cos(90-\theta) & \sin(90-\theta) \\ -\sin(90-\theta) & \cos(90-\theta) \end{bmatrix} \begin{bmatrix} x \\ y \end{bmatrix}$$

where (x,y) denotes original coordinates of the side face image, (X,Y) denotes rotated coordinates, and (90−θ) denotes a rotation angle.

In addition, the face image generating device generates true side images for left and right sides of the side face image, and sets, as a valid true side image, one of the true left side image and the true right side image in which a distance between a lowest point of the nose and the chin is 0.7 to 2 times a length of the nose and in which a protruding size of the nose is greater than a height of the nose.

BRIEF DESCRIPTION OF THE DRAWINGS

The above and other objects, features and advantages of the present invention will be more apparent from the following detailed description taken in conconfluence with the accompanying drawings, in which.

DETAILED DESCRIPTION OF THE PREFERRED EMBODIMENT

Since the description of the present invention is a mere embodiment for structural and functional description, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them.

Unless differently defined, all the terms used here including technical or scientific terms have the same meaning with what is generally understood by one who has common knowledge in the technical field that this invention belongs to. The terms such as those defined in the dictionary commonly used will be interpreted to have the meanings matching with the meanings in the context of the related technologies. Unless clearly defined in this application, they are not interpreted as ideal or excessively formal meanings.

Figure 1:
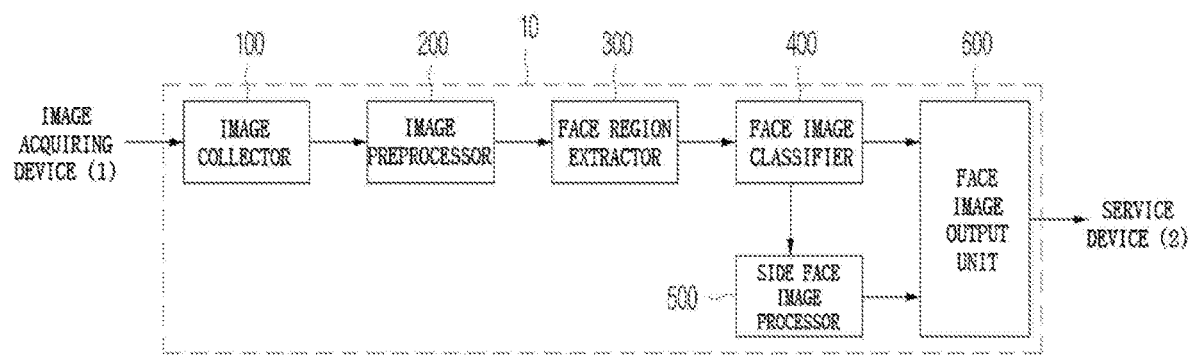
FIG. 1 is a block diagram in which configurations of a face image generating device for face recognition according to the present invention are functionally separated.

FIG. 1 is a block diagram in which configurations of a face image generating device for face recognition according to the present invention are functionally separated.

Referring to FIG. 1, a face image generating device (10) for face recognition according to the present disclosure may generate a face image for face recognition from images collected from an image acquiring device (1) and provide the generated face image to a service device (2).

In this case, a plurality of image acquiring devices (1) may be installed at different locations, and the service device (2) may be any service system capable of extracting a face image of a person from images acquired from an image acquiring device and classifies the person. For example, the service device may be an access management system, a security system, and the like. In addition, a face image generating device (10) for face recognition according to the present disclosure may be provided in the service device (2).

The face image generating device (10) for face recognition may include an image collector (100), an image pre-processor (200), a face region extractor (300), a face image classifier (400), a side face image processor (500), and a face image output unit (600).

The image collector (100) may collect image data in units of frames from the image acquiring device (1).

The image pre-processor (200) may extract a landmark value at a preset location from the image data collected from the image collector (100), and may perform image correction by applying the extracted landmark value to Open Source Computer Vision (OpenCv). In this case, OpenCV is a programming library aimed at real-time computer vision, and especially provides a computer-assisted application that automatically identifies each person through digital images.

That is, the image pre-processor (200) may call "GML Camera Calibration Toolbox", extract a landmark value from image frames collected from the image acquiring device (1) using "GML Camera Calibration Toolbox", and acquire an image that is corrected by applying the extracted landmark value to calbration.cpp among sample folders of OpenCv.

The face region extractor (300) may extract a face candidate region from image data, that is, a corrected image, based on color information. At this point, the face region extractor (300) may convert an RGB-based image data output from the image pre-processor (200) into a YCbCr image, and extract a face candidate region using skin color information of the face image. At this time, the RGB image and the YCbCr image may be converted under a condition as in Equation 1.

$$\begin{bmatrix} Y \\ C_b \\ C_r \end{bmatrix} = \begin{bmatrix} 16 \\ 128 \\ 128 \end{bmatrix} + \begin{bmatrix} 0.257 & 0.504 & 0.098 \\ -0.148 & -0.291 & 0.439 \\ 0.439 & -0.368 & -0.071 \end{bmatrix} * \begin{bmatrix} R \\ G \\ B \end{bmatrix} \quad \text{Equation 1}$$

In addition, as shown in Equation 1, color coordinates of the YCbCr image are composed of a pixel component (Y) and a color component (Cb, Cr). In the present disclosure, the face region extractor (300) may extract a face candidate region using only the color component of the YCbCr image.

The face region extractor (300) may determine a face candidate region based on a condition as in Equation 2.

$$B(x, y) = \begin{cases} 1 & \text{if } (73 \leq C_b \leq 132) \cap (124 \leq C_r \leq 171) \\ 0 & \text{otherwise} \end{cases} \quad \text{Equation 2}$$

Here, B(x,y) indicates a face region extracted based on skin color.

That is, according to Equation 2, a region satisfying a condition where Cb is "no less than 73 and no more than 132" and Cr is "no less than 124 and no more than 171" may be extracted as a face candidate region.

Then, the face region extractor (300) may determine a face region based on whether a face candidate region includes at least two features of an eye, a nose, and a mouth.

The face image classifier (400) may classify a front face and a side face based on an eye feature present in a face region and an aspect ratio of the face region. For example, when there are two features corresponding to an eye in a face region and a distance between two eyes or an eye size satisfies a preset eye condition, the face image classifier (400) may extract the corresponding face region and determine the extracted face region as a front face image. In addition, the rest of the face region in which an eye feature exists alone may be determined as a side face image.

In addition, when the aspect ratio of a face is about "no less than 1:1.5 and no more than 1:2.5", preferably about 1:2, a side face image may be determined in the end.

The side face image processor (500) may process a side face image determined by the face image classifier (400) into a true side image. At this time, the side face image processor (500) obtains an equation for a straight line using the Hough transform, extracts the location of the chin located below the face from the side face image, and uses the Sobel technique to set a portion with the largest horizontal component value as the chin. Then, X axis corresponding to the horizontal axis may be set with respect to the chin, a virtual straight line may be moved along a lateral contour with respect to the location of the chin, and an equation of a straight line with the maximum frequency of skin color may be obtained to calculate an angle (θ) between a side face straight line (y) and the X axis.

Figure 2:
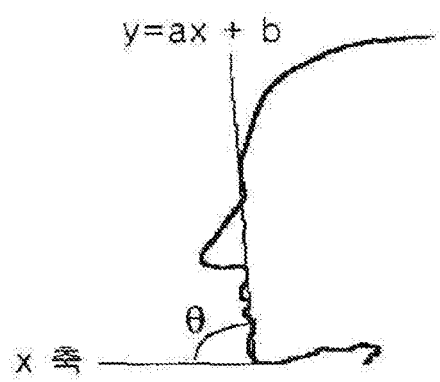
FIG. 2 and FIG. 3 are drawings for describing a processing process of a side face image in a side face image processor (500) shown in FIG. 1.

FIG. 2 illustrates the size face straight line (y) having a pre-determined inclination, and the X axis (horizontal axis) with respect to the chin. In this case, the angle (θ) formed by the side face straight line (y) and the X-axis is a degree of inclination of a side face.

Accordingly, the side face image processor (500) may rotate a side face image by an angle of (90−θ) in the clockwise direction (the left-side image) or in the counter-clockwise direction (the right-side image), thereby acquiring a true side image whose inclination is corrected.

$$\begin{bmatrix} X \\ Y \end{bmatrix} = \begin{bmatrix} \cos(90-\theta) & \sin(90-\theta) \\ -\sin(90-\theta) & \cos(90-\theta) \end{bmatrix} \begin{bmatrix} x \\ y \end{bmatrix} \quad \text{Equation 3}$$

Here, (x,y) denotes the original coordinates of the side face image, (X,Y) denotes the rotated coordinates of the side face image, and (90−θ) denotes an angle of rotation.

At this time, the side face image processor (500) may generate left and right face images for the side face image and calculate the degree of inclination of the side face based on the left and right face images.

In addition, the side face image processor (500) may determine whether each side face image corresponds to a left side or a right side based on the protruding height of the nose region in a corresponding side face image, and may set only a true side image for the determined side as a valid image.

Figure 3:
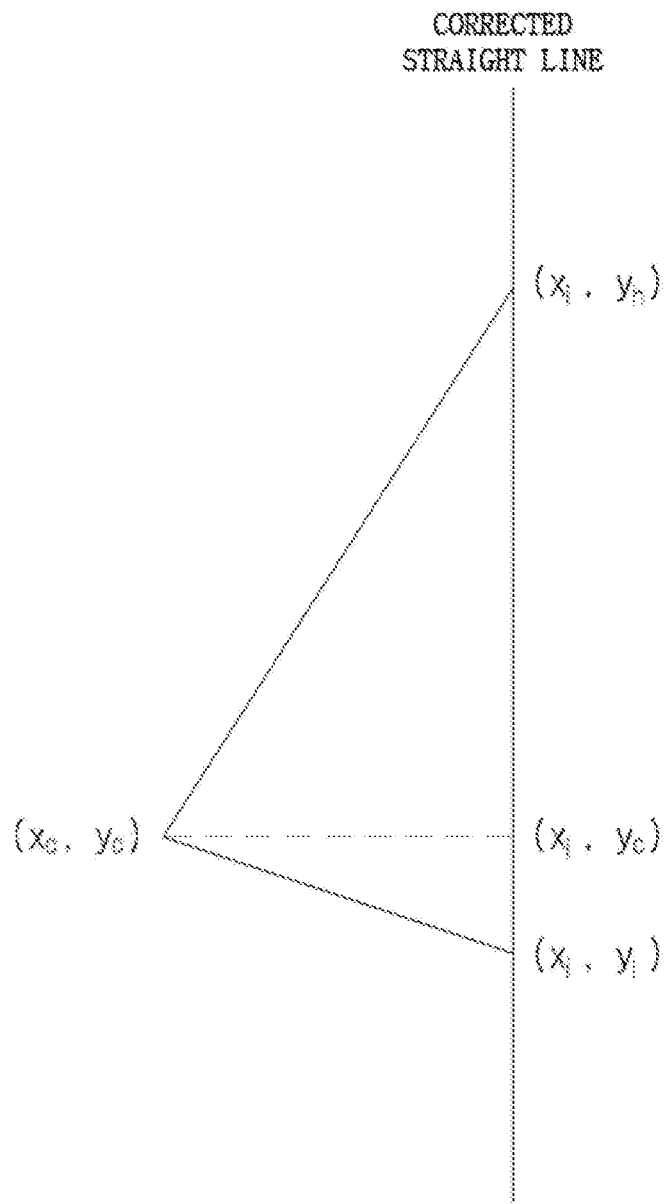

Referring to FIG. 3, in regard to a nose region of a true side image, a point protruding the highest from the middle of the side image on a horizontal line corresponding to an equation where a inclination is corrected is set as a nose protruding point ($x_c$, $y_c$). Then, chain codes are applied upwardly and downwardly from the nose protruding point ($x_c$, $y_c$), a point of a line upwardly extending therefrom is set as an upper end ($x_i$, $y_h$) and a point of a line downwardly extending therefrom is set as a lower end ($x_i$, $y_l$).

The side face image processor (500) may calculate a length of the nose based on a difference between the y coordinate value ($y_h$) of the upper end and the y coordinate value ($y_l$) of the lower end, and primarily determine whether a corresponding side face image is a left-side face image or a right-side face image on the basis of the fact that a distance between the lower end (the lowest point) of the noise and the chin is 0.7 to 2 times the length of the nose.

In this case, when a condition where a distance between the lowest point of the nose and the chin is 0.7 to 2 times the length of the nose on both the left-side face image and the right-side face image, the side face image processor (500) may determine one of the left-side and right-side images of the face in which a protruding size of the nose is greater than a height of the nose as a valid side face image.

The face image output unit (600) may convert a front face image and a true side image into a size required by the service server (2) and output them. In this case, the face image output unit (600) may provide a face image for recognition that has been converted into a different size for each preset distance. For example, a face image for recognition is converted such that the size of the face image decreases as a distance between the image acquiring device (1) and a subject person increases. A face image may be converted into the size of 50×50 when the distance is 1 m, the size of 30×30 when the distance is 2 m, the size of 20×20 when the distance is 3 m, the size of 16×16 when the distance is 4 m, and the size of 12×12 when the distance is 5 m.

Next, a method of generating a face image for face recognition according to the present disclosure will be described with reference to FIGS. 4 and 5.

Figure 4:
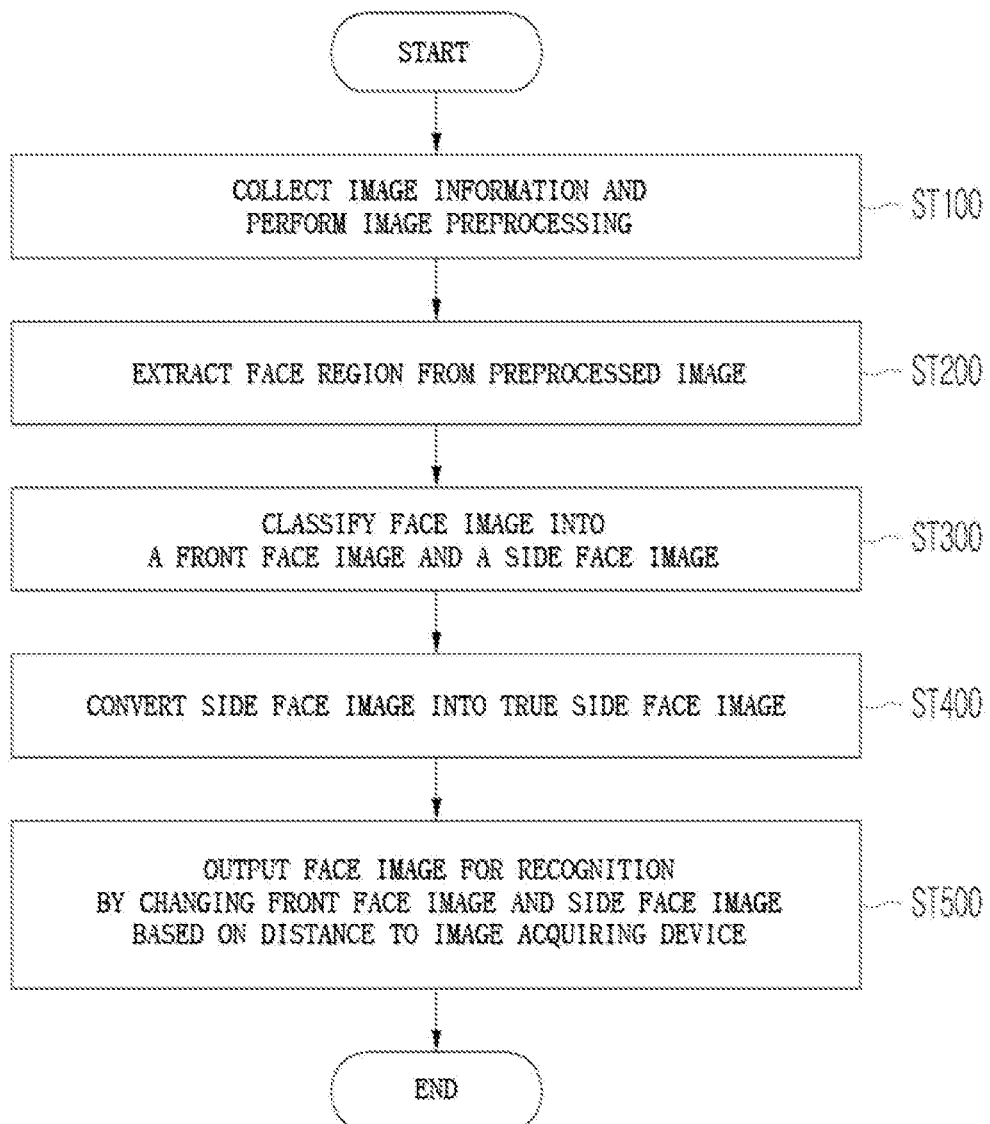
FIG. 4 is a drawing for describing a face image generating method for face recognition according to the present.

First, referring to FIG. 4, the face image generating device (10) may collect image information from the image acquiring device (1) and perform pre-processing on the collected image in ST100. The image acquiring device (1) may extract a landmark value at a preset location from the pre-processed image data, and perform image correction by applying the extracted landmark value to OpenCv.

Then, the face image generating device (10) may extract a face image from the pre-processed image in ST200. In this case, the face image generating device (10) may convert an RGB-based image frame into an YCbCr image, extract a face candidate image from the YCbCr based on skin color, and determine a face image based on whether the face candidate image includes at least two features corresponding to an eye, a nose, or a mouth.

Then, the face image generating device (10) may determine whether a face region determined in ST200 is a front face image or a side face image, and classify the determined face region in ST300. When a face image includes two features corresponding to an eye, the face image generating device (10) may determine a corresponding face image as a front face image and other face image as a side face image. In this case, when the aspect ratio of the face in the face image is a ratio of about "1:1.5 or more", the corresponding face image may be finally determined as a side face image. And, if there are no two features corresponding to an eye and the condition where the aspect ratio of the face is "1:1.5 or more" is not satisfied, the corresponding face image may be finally determined as the front face image.

In this case, the face image generating device (10) may convert the side face image classified in ST300 into a true side image in ST400.

In addition, the face image generating device (10) may change the size of the front or side face image based on a distance between a face image location in the image and a photographing location, output the resultant image as a face image for recognition, and provide the image to the service device (2) in ST500. In this case, the face image generating device (10) may provide the service device with face image recognition information, which includes the face image for recognition, a unique ID of the image acquiring device, and frame information. Further, the frame information may include a frame number and a frame image.

Figure 5:
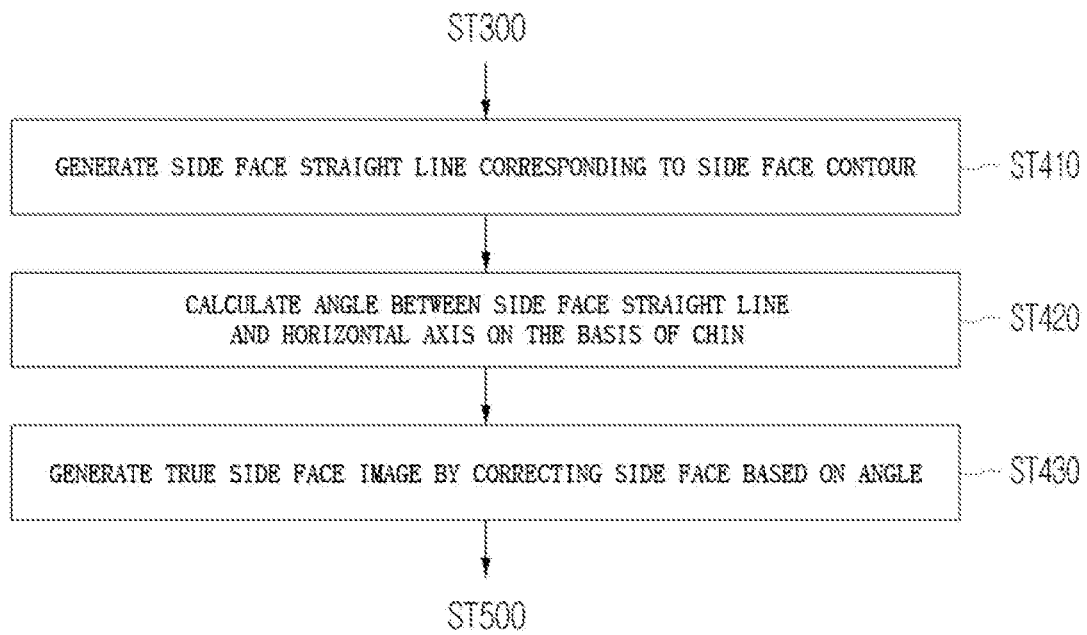
FIG. 5 is a drawing for describing in more detail a process (ST400) for converting a side face image into a true side image in FIG. 4.

In FIG. 5, the operation ST400 of converting a side image to a true side image in FIG. 4 (ST400) is shown in more detail.

Referring to FIG. 5, the face image generating device (10) may extract a side face contour from the side image determined in ST300, and generate a side face straight line corresponding to a side inclination of the face based on the contour in ST410. In this case, the side face straight line is determined as a straight line having a maximum frequency of skin color on the straight line while moving a virtual straight line along the contour with respect to the chin.

Then, the face image generating device (10) may set a location of the chin in the face region as a horizontal axis, and calculate an angle famed by the horizontal axis and the side face straight lines, which is generated in ST410, in ST420.

Then, the face image generating device (10) may correct a side face image based on the angle calculated in ST420 to generate a true side image in ST430. The true side image is generated by correcting the side face so that the side face straight line becomes a vertical line relative to the horizontal axis.

In addition, in ST400, true side images for the left and right sides of the side face image are generated, respectively, and one of the true left side image and the true right side image in which a distance between a lowest point of the nose and the chin is 0.7 to 2 times the nose length and in which a protruding size of the nose is greater than a height of the nose may be set as a valid true side image.

According to the present invention, the method is implemented by extracting a face image of a person from images collected from an image acquiring device and processing a side face image into a true side image based on morphological characteristics of the face, so that it is easily applied to any system for recognizing the face of the person, thereby recognizing the face of the person more accurately.

While the present invention has been described with respect to the specific embodiments, it will be apparent to those skilled in the art that various changes and modifications may be made without departing from the spirit and scope of the invention as defined in the following claims.

What is claimed is:

1. A face image generating method for recognizing face performed by a face image generating device to extract a face image from image frames collected from an image acquiring device and generate a face image for face recognition, the method comprising:
a first step of converting an RGB-based image frame received from the image acquiring device into a YCbCr image;
a second step of setting a region satisfying a skin color condition in the YCbCr image as a face candidate region;
a third step of determining a face region based on whether at least two feature points corresponding to an eye, a nose, or a mouth is included in the face candidate region;
a fourth step of classifying a front face or a side face based on an eye feature existing in the face region and an aspect ratio of the face region and extracting each face region, thereby generating a front face image and a side face image;
a fifth step of calculating a degree of inclination of a side face in the side face image based on location information of a nose and a chin and generating a true side face image using the calculated degree of inclination; and
a sixth step of generating a face image for recognition by converting the front face image and the side face image into different sizes according to a distance to the image acquiring device.

2. The method of claim 1, wherein in the first step, the face image generating device calls GML Camera Calibration Toolbox, extracts a landmark value from an RGB-based image frame collected from the image acquiring device using the GML Camera Calibration Toolbox, and converts an RBG-based image, which has been preprocessed by applying the extracted landmark value using calbration.cpp among sample folders of OpenCV, into a YCbCr image.

3. The method of claim 1, wherein, in the first step, the face image generating device converts the RGB-based image frame into the YCbCr image according to the following equation, and
wherein, in the second step, the face image recognizing device extracts, as the face candidate region, a region satisfying a condition where Cb is "no less than 73 and no more than 132" and Cr is "no less than 124 and no more than 171"

$$\begin{bmatrix} Y \\ C_b \\ C_r \end{bmatrix} = \begin{bmatrix} 16 \\ 128 \\ 128 \end{bmatrix} + \begin{bmatrix} 0.257 & 0.504 & 0.098 \\ -0.148 & -0.291 & 0.439 \\ 0.439 & -0.368 & -0.071 \end{bmatrix} * \begin{bmatrix} R \\ G \\ B \end{bmatrix}.$$

4. The method of claim 1, wherein, in the fourth step, the face image generating device determines the face region as the side face image when an aspect ratio of the face region is about no less than "1:1.5" and no more than "1:2.5".

5. The method of claim 1, wherein the fifth step comprises:
a step of extracting, by the face image generating device, a contour of the side face image, moving a virtual straight line along the contour with respect to the chin, and generating a side face straight line having a maximum frequency of skin color on the straight line;
a step of setting a location of the chin on the side face image as a horizontal axis, and calculating an angle between the horizontal axis and the side face straight line; and
a step of generating a true side face image by correcting a side face based on the following equation so that the side face straight line becomes a vertical line relative to the horizontal axis, $$\begin{bmatrix} X \\ Y \end{bmatrix} = \begin{bmatrix} \cos(90-\theta) & \sin(90-\theta) \\ -\sin(90-\theta) & \cos(90-\theta) \end{bmatrix} \begin{bmatrix} x \\ y \end{bmatrix}$$

where (x,y) denotes original coordinates of the side face image, (X,Y) denotes rotated coordinates, and (90−θ) denotes a rotation angle.

6. The method of claim 5, wherein the face image generating device generates true side images for left and right sides of the side face image, and sets, as a valid true side image, one of the true left side image and the true right side image in which a distance between a lowest point of the nose and the chin is 0.7 to 2 times a length of the nose and in which a protruding size of the nose is greater than a height of the nose.

\* \* \* \* \*